(12) United States Patent
Klug et al.

(10) Patent No.: US 11,349,878 B2
(45) Date of Patent: *May 31, 2022

(54) METHOD FOR HANDLING SECURITY SETTINGS IN A MOBILE END DEVICE

(71) Applicant: Unify GmbH & Co. KG, Munich (DE)

(72) Inventors: Karl Klug, Miesbach (DE); Jurgen Totzke, Poing (DE)

(73) Assignee: Unify GmbH & Co. KG, Munich (DE)

( * ) Notice: Subject to any disclaimer, the term of this patent is extended or adjusted under 35 U.S.C. 154(b) by 151 days.

This patent is subject to a terminal disclaimer.

(21) Appl. No.: 16/908,808

(22) Filed: Jun. 23, 2020

(65) Prior Publication Data

US 2020/0322388 A1 Oct. 8, 2020

Related U.S. Application Data

(63) Continuation of application No. 14/569,816, filed on Dec. 15, 2014, now Pat. No. 10,728,285.

(30) Foreign Application Priority Data

Jan. 23, 2014 (DE) .......................... 102014000963.7

(51) Int. Cl.
*G06F 21/00* (2013.01)
*H04L 9/40* (2022.01)
(Continued)

(52) U.S. Cl.
CPC ............ *H04L 63/20* (2013.01); *H04L 63/107* (2013.01); *H04W 12/08* (2013.01); *H04W 12/30* (2021.01); *H04W 12/37* (2021.01); *H04W 12/63* (2021.01)

(58) Field of Classification Search
None
See application file for complete search history.

(56) References Cited

U.S. PATENT DOCUMENTS 6,366,578 B1 * 4/2002 Johnson .................. H04L 67/00
704/200
6,731,625 B1 * 5/2004 Eastep .................. H04Q 3/0029
379/93.07

(Continued)

OTHER PUBLICATIONS

Shiraz, Muhammad et al. A Review on Distributed Application Processing Frameworks in Smart Mobile Devices for Mobile Cloud Computing. IEEE Communications Surveys & Tutorials, vol. 15, Issue: 3. https://ieeexplore.ieee.org/stamp/stamp.jsp?tp=&arnumber=6365155 (Year: 2013).*

(Continued)

*Primary Examiner* — Jeremiah L Avery
(74) *Attorney, Agent, or Firm* — Buchanan Ingersoll & Rooney PC

(57) ABSTRACT

In a procedure for handling security settings of a mobile end device the operating conditions of the end device are determined. Then minimum security requirements are established according to the operating conditions by evaluating contextual data regarding the operating conditions of the end device. Next it is determined whether the security settings on the end device comply with at a least with the minimum security requirements. Access to applications is allowed or denied according to the security settings on the mobile end device. Should the end device not meet minimum security requirements the user may be prompted to change the security settings on the end device. The method may involve locating the end device and issuing of a warning in the end device does not meet minimum security settings.

20 Claims, 15 Drawing Sheets

(51) Int. Cl.
*H04W 12/08* (2021.01)
*H04W 12/37* (2021.01)
*H04W 12/30* (2021.01)
*H04W 12/63* (2021.01)

(56) References Cited

U.S. PATENT DOCUMENTS

| | | | | |
|---|---|---|---|---|
| 7,272,815 | B1* | 9/2007 | Eldridge | G06F 8/71 717/109 |
| 7,657,946 | B2‡ | 2/2010 | Yan | G06F 21/6218 726/28 |
| 8,316,237 | B1* | 11/2012 | Felsher | H04L 9/3249 380/282 |
| 8,788,655 | B2* | 7/2014 | Dare | H04L 67/04 709/224 |
| 9,286,482 | B1* | 3/2016 | Dumont | G06F 21/32 |
| 2002/0171546 | A1‡ | 11/2002 | Evans | G06F 21/88 340/54 |
| 2003/0097590 | A1‡ | 5/2003 | Syvanne | H04L 63/0227 726/4 |
| 2003/0110169 | A1‡ | 6/2003 | Zuili | G01N 33/5088 |
| 2004/0123153 | A1‡ | 6/2004 | Wright | H04L 63/107 726/1 |
| 2005/0272445 | A1‡ | 12/2005 | Zellner | H04M 1/72572 455/45 |
| 2008/0052395 | A1‡ | 2/2008 | Wright | H04L 63/20 709/22 |
| 2009/0006644 | A1* | 1/2009 | Forstall | H04W 12/37 709/232 |
| 2010/0023865 | A1‡ | 1/2010 | Fulker | G06F 3/04817 715/734 |
| 2010/0325684 | A1‡ | 12/2010 | Grebenik | G06F 21/604 726/1 |
| 2011/0023082 | A1‡ | 1/2011 | Narasinghanallur | G06F 21/6218 726/1 |
| 2011/0238994 | A1* | 9/2011 | Baentsch | H04L 63/0884 713/169 |
| 2012/0036552 | A1* | 2/2012 | Dare | H04L 41/0803 726/1 |
| 2012/0210443 | A1* | 8/2012 | Blaisdell | H04W 12/37 726/27 |
| 2012/0246731 | A1* | 9/2012 | Blaisdell | G06F 21/53 726/26 |
| 2013/0205415 | A1* | 8/2013 | McKee | G06F 21/12 717/165 |
| 2013/0254831 | A1‡ | 9/2013 | Roach | H04L 63/107 726/1 |
| 2014/0006347 | A1‡ | 1/2014 | Qureshi | G06F 21/53 707/62 |
| 2014/0098671 | A1* | 4/2014 | Raleigh | H04M 15/53 370/235 |

OTHER PUBLICATIONS

Skow, E. et al. A security architecture for application session handoff. 2002 IEEE International Conference on Communications. Conference Proceedings. ICC 2002. https://ieeexplore.ieee.org/stamp/stamp.jsp?tp=&arnumber=997210 (Year: 2002).*

Shen, ZhengMing; Thomas, Johnson P. Security and QoS Self-Optimization in Mobile Ad Hoc Networks. IEEE Transactions on Mobile Computing, vol. 7, Issue: 9. https://ieeexplore.ieee.org/stamp/stamp.jsp?tp=&arnumber=4358998 (Year: 2008).‡

Bohio, Muhammad; Miri, Ali. Authenticated secure communications in mobile ad hoc networks. Canadian Conference on Electrical and Computer Engineering 2004. https://ieeexplore.ieee.org/stamp/stamp.jsp?tp=&arnumber=1349738 (Year: 2004).‡

Shen, ZhengMing; Thomas, Johnson P. Security and QoS Self-Optimization in Mobile Ad Hoc Networks, IEEE Transactions on Mobile Computing, vol. 7, Issue: 9, https://ieeexplore.ieee.org/stamp/stamp.jsp?tp=&arnumber=4358998 (Year: 2008).

Abu-Saymeh, Dirar et al. An Application Security Framework for Near Field Communication 2013, 12th IEEE International Conference on Trust, Security and Privacy in Computing and Communications, https://ieeexplore.ieee.org/stamp/stamp.jsp?tp=&arnumber=6680867 (Year: 2013).

Bohio, Muhammad; Miri, Ali Authenticated Secure Communications in Mobile ad Hoc Networks, Canadian Conference an Electrical and Computer Engineering 2004, https://ieeexplore.ieee.org/stamp/stamp.jsp?tp=&arnumber=1349738 (Year: 2004).

\* cited by examiner
‡ imported from a related application

Application Termination

Overall sequence

| Personalized Security Preference | | Network Context | Device Context | Application Context |
|---|---|---|---|---|
| Privately | | | | |
| | All the Same | All | Connecting | All |
| | Alias | All | Connecting | Masked Identity |
| | Privacy | Encrypted Content | Authenticated Infrastructure | User Authenticated |
| Professional | | | | |
| | Managed | Secure Transmission | Authenticated Infrastructure | |
| | Unmanaged | Secure Transmission | Connecting | Directory List/ Trustworthy Manufacturer |
| | Confidential | Encrypted Content/ Secure Transmission | Authenticated Infrastructure | User Authenticate |
| Familiar | | All | Authenticated Infrastructure | Directory List/ Trustworthy Manufacturer/ Transitive Trust |

TABLE 1

Fig. 13

|  |  | User Preference | Company Policy Internet | Company Policy Internet | Device Characteristics | Network Properties |
|---|---|---|---|---|---|---|
| Blackbox View |  |  |  |  |  |  |
|  | Platform | ./. | Currently Set | Currently Set | Managed/Unmanaged | ./. |
|  | Protocols | Safe/Unsafe | Open | Open | Managed/Unmanaged | Secure transmission/ encrypted content |
| Components view |  |  |  |  |  |  |
|  | Component Architecture |  |  |  |  |  |
|  | Equipment | ./. | Access Control | Access Control | Checked/Unchecked | ./. |
|  | Private Data | Privacy | ./. | ./. | Encrypted Content | Secure transmission/ encrypted content |
|  | Company Details | Protection | Access Control | Protection | Encrypted Content | Secure transmission/ encrypted content |
| Installation View |  |  |  |  |  |  |

TABLE 2 (Start)

Fig. 14A

| Threat Assessment | | User Preference | Company Policy Internet | Company Policy Internet | Device Characteristics | Network Properties |
|---|---|---|---|---|---|---|
| | Out of Service Attack | Availability | Availability | Availability | Anomaly Detection | Anomaly Detection |
| | Destruction | Access Control | Access Control | Access Control | Access Control | ./. |
| | Publication | Access Control | Access Control | Access Control | Access Control | Secure transmission/ encrypted content |
| | Insertion | Access Control | Access Control | Access Control | Access Control | ./. |
| | Inception / eyes dropping | Secured / Unsecured | Secure transmission/ encrypted content | Secure transmission/ encrypted content | Secure transmission/ encrypted content | Secure transmission/ encrypted content |
| | Manipulation | Access Control | Access Control | Access Control | Access Control | Secure transmission/ encrypted content |
| | Masking / Abusive Use | Access Control | Access Control | Access Control | Access Control | ./. |
| | Playback | Playback window | Playback window | Playback window | Playback window | ./. |
| | Non-recognition | Tracking | Tracking | Tracking | ./. | ./. |
| | Traffic Analysis | ./. | Secured Management | Secured Management | ./. | Secured Management |
| | Unauthorized Transmission | Access Control | Access Control | Access Control | Access Control | Secure transmission/ encrypted content |
| | Unauthorized Transmission | Access Control | Access Control | Access Control | Access Control | ./. |

TABLE 2 (Continuation)

Fig. 14B

| Threat Characteristics | | User Preference | Company Policy Internet | Company Policy Internet | Device Properties | Network Properties |
|---|---|---|---|---|---|---|
| | Authenticity | Verified | Verified | Verified | Tested /Untested | User/device |
| | Availability | Available | Based on Service Level Agreement | Based on Service Level Agreement | ./. | SLA-Based/ Connected |
| | Confidentiality | Confidential / Not Confidential | Confidential / Not Confidential | Confidential / Not Confidential | ./. | Secure transmission/ encrypted content |
| | Integrity | Trustworthy | Trustworthy | Trustworthy | ./. | ./. |
| | Liability | Liable | Liable | Liable | ./. | ./. |
| | Privacy | Private/ Public | Access Controls | Access Controls | Access Controls | ./. |
| | Credibility | Familiar / Indirectly Trust | Familiar | Familiar / Indirectly Trust | Familiar Environmental System | Confidential / Not Confidential |

TABLE 2 (End)

Fig. 14C

METHOD FOR HANDLING SECURITY SETTINGS IN A MOBILE END DEVICE

CROSS-REFERENCE TO RELATED APPLICATIONS

This application is a continuation application of U.S. patent application Ser. No. 14/569,816, which claims priority to German Patent Application No. 10 2014 000 963.7, filed on Jan. 23, 2014.

FIELD OF INVENTION

The invention relates to a method for handling security settings in a mobile end device, a method for access control, a mobile end device, a computer program, a software product and a digital storage medium.

BACKGROUND OF THE INVENTION

The ever more frequent use of mobile devices and the use of private mobile devices in the professional environment (BYOD—"Bring Your Own Device") is a challenge to security mechanisms with respect to the use of such devices. Today's IT-security mechanisms are usually platform-, device-, user- or application oriented. IT-platforms are usually centrally managed and their operating systems hardened. Safety criteria of applications are usually defined by the provider, e.g. for web applications the access (http) is implemented as simple or secure (https), the maximum encryption used is set via the browser or the service. The access to the IT applications for users is usually set via a user account or domain name registration, in case of existing PKI infrastructure or domain controllers if appropriate also via single-sign-on-mechanism. That is to say, in a managed environment therefore largely security can be implemented. In case of mobile applications a problem arises that users can intentionally bypass security mechanisms to overcome possible related hurdles. The use of an application or information retrieval on the mobile device often receives priority over the security aspect. It would be desirable to achieve comparable security for such uses as in managed environments.

It is well known that security solutions based on authentication and authorization of the user or device and encryption technology are being developed. Secure access can be granted for the legitimate user for a certain period of time (e.g. operating system login or the duration of a session of an application). Often the user in the specific case is not aware if IT applications and information are being used in secure or insecure modus.

So-called security assessment checklists are intended to contribute to secure IT systems and in particular mobile access to these systems according to the current state of security technology. An absolute security cannot be achieved, however a decision has to be made between the effort it will take to attack the security of a system, and the to be assumed probable cost and degree of damage. Certain security requirements also arise from legal procedures or rules.

SUMMARY OF THE INVENTION

It is a task of the present invention to further develop this approach. A special task is to provide a simple but safe handling for the mobile use of an end device and the use of different applications. A further task is establishing a security profile, which is suited to the context of a mobile end device, automated and compatible with current safety requirements. A further task consists of enabling the user of a mobile end device with context-sensitive automatic security setting, without disabling current minimum security measures. Finally, a task of the invention is to facilitate access control of mobile end devices and the enforcement of safety standards in the context of industrial or public institutions, such as company areas, manufacturing facilities, meeting and exhibition spaces, etc.

The task is solved in accordance with the invention by the characteristics of the independent claims. Advantageous embodiments and further developments of the invention are specified in the sub-claims.

According to a first aspect of the invention a method for controlling security settings of a mobile end device is proposed, with the steps:

(a) Determination of the operating conditions of the end device;
(b) Establishing minimum security requirements according to the operating conditions by evaluating contextual data regarding the operating conditions of the end device;
(c) Automatic determination and meeting of security settings on the end device, whereas the security settings have to comply at a least with the minimum security requirements; and
(d) Control of applications according to the security settings, whereas the implementation of the above steps (a) to (d) is controlled by at least one on the end device's enabled agents.

For the purposes of the invention a mobile end device is every device, which is set for mobile-computing and communication, in particular mobile phones, smart phones, PDAs, portable computers such as laptops, notebooks, and tablet computing devices. Within the meaning of the invention an agent is understood as a software program with autonomous (i.e., working regardless of intervention by the user), modal adaptive (i.e., changing its own settings such as parameters and/or structure due to their own states and of states of the environment), proactive (i.e., active based on its own initiative) and reactive (i.e. responsive to changes in the environment) properties or functionalities, preferably software sensor and/or hardware sensor/device drivers, in particular for compliance with minimum security requirements. In particular an agent can also be understood as an application, which serves the interests of a third party (employer, business partners, service providers, organizers, public institutions). An agent can be preloaded and installed or installed in advance or installs itself during activation. As operating conditions within the meaning of the invention are understood device properties, device location, network health, company policy regarding Internet and Intranet usage and the like. Security settings within the meaning of the invention are understood as a level of security or a security profile in relation to device-, network-, company policy properties etc. Whereas the minimum security requirement is a minimum required security level, which can be enforced by the agent through policies depending on the operating conditions. The determination of the operating conditions can entail, for example, but is not limited to, the evaluation of the location of a GPS or another position determination device, the analysis of sensor data, the reception of Meta data of an external instance such as an MDM (Mobile Device Management) server or the like of the third party. Applications, within the meaning of the invention, are software programs (batch files, macros, mobile apps, which should be restricted in execution by a company policy for example, with regard to potential malicious software), network resources (intranet pages, Internet, research access, which should be restricted by a company policy for example, with regard to politically incorrect content or cost accrual), device applications (audio recording, camera, speakers, network access, radio functions, which should be limited for instance by a company policy with respect to security concerns). Control can mean for example, however is not limited to, an identification of executable/not executable applications, blocking of the execution or termination ("shooting down") of undesired applications, selecting/blocking/shutting down of certain functions. It goes without saying that the steps (a) to (d) can be repeated indefinitely.

With the process according to the invention, a context-sensitive security handling is introduced, which enables a simple and secure use of mobile end devices in a third party environment with limitations in terms of their legitimate interests, however only in the extent necessary and only in the given case. Company internal safety standards can be enforced, depending on location, even small-scale, for example, in relation to certain areas, buildings, departments, and rooms.

By a representation of the determined the security settings and/or minimum security demands in a recognizable way for a user of the end device, in particular on a display of the end device of the invention, in accordance with a preferred embodiment of the invention the current status and possible restrictions are visible to the user, he is not "overwhelmed", and if necessary, he can intervene or modify his behavior. This includes a display within the meaning of the invention each appropriate for an observation by a user, in particular, but not limited to, display on a screen, single LEDs (for certain device specific features), acoustic warnings, vibration or the like. For example, an alarm can sound in the end device when the security settings change.

A preferred embodiment of the invention includes a designation of applications in terms of restrictions, which derives from the security settings, in particular by changing the ideograph of the respective application on a display of the end device depending on the security settings. Any form of representation as a symbol of the application, such as a list entry, a symbol, an icon, a link or the like is understood as an ideograph. The modification can entail, for example, but is not limited to, the addition of a symbol, shading, a frame, if necessary, each in different colors depending on the status, a pale or transparent representation and the like. This allows a user to gage and adjust if necessary in advance the effectiveness of the current security settings.

In accordance with a preferred embodiment of the invention a change of the security settings can occur, whereas a falling below the minimum security requirements is prevented, at least in response of one of the following situations:

The user's interaction,
Start of an application,
Termination of an application,
Changes in the operating conditions.

With this an increased flexibility can be achieved, as a falling below the minimum security requirements is prevented the security requirements can be reliably maintained.

In accordance with a preferred embodiment of the invention meeting the minimum security requirements is accomplished by at least one of the following measures:

Turning off of the end device;
Termination, disabling, or blocking applications that do not meet the minimum security requirements;
Termination, disabling, or blocking of functions which would violate or infringe on the minimum security requirements;
Ignore user settings or user input, which would violate the minimum security requirements.

By this is also a mandatory or if necessary automated enforcement of security requirements is ensured.

According to a first aspect of the invention a method for controlling security settings of a mobile end device is proposed, with the steps:

(A) Locate the end device;
(B) Contact of the end device;
(C) Determine whether the agent for the implementation of the procedure laid down in one of the claims 1 to 5 is activated on the end device; and
(D) If the answer in regard to Step (C) is no: Issuing of a warning, where the steps (A) to (D) are executed by of an instance external to the end device.

This procedure is complementary to the previously described procedure for handling security settings. It can for example be implemented through a security service, site security, etc. such as a security server, MDM server or the like. The detection can also include the determination whether a particular intervention by the agent is possible (e.g. deactivation of the camera, the sound recording capability). For example, localizing can include capturing a radio interface. Contacting can include, for example, establishing a communication connection via a wireless interface, GSM interface, infrared interface, Bluetooth interface or the like. A warning, for example, can be realized by a warning light, a warning horn, blocking of a barrier or a pedestrian flow control system, a comment in an earphone of a security person, etc. The warning can also include the identification and localization of the end device and/or the person carrying the end device for security personnel. Through the procedure laid down in this aspect access controls can also be facilitated. An optional automated upload and/or an automated activation of the agent on the end device can be intended.

The invention relates in a further aspects also a mobile end device, which is set up for the implementation of the described procedure, a computer program, comprehensive programming instructions that cause a computer to execute the procedural steps of the described procedure, if the computer program is loaded or executed on the computer, a software product, which is stored on a computer-readable medium, and which preferably can be loaded directly into the internal memory of a computer and the program code for the implementation of the procedural steps of the procedure described above exists, if the computer program is running on the computer, and a digital storage medium with electrically readable control signals, which can work with a programmable computer to manage communication processes, whereas the control signals are designed and adapted to initiate the computer, to execute the procedural steps of the procedure, can be embodied. The computer can be embodied, depending on which procedure will be carried out, in the end device or the external instance. This device solves the task of the present invention, for the same reasons as have been specified above for the corresponding procedure.

More features, tasks, advantages and details of the present invention will be demonstrated more specific from the following description of concrete implementation examples and their drawings in the attached figures. It goes without saying that characteristics, tasks, advantages and details of individual design examples are transferable to other design embodiments and should be considered as disclosed in the context of the other embodiments, in so far as this is not possible due to technical reasons or be is obviously absurd due to natural science reasons. Embodiments can be combined with each other, and the combination can also be understood as an embodiment of the invention.

The invention will be described in detail based on preferred embodiments and with the help of figures.

BRIEF DESCRIPTION OF THE FIGURES

FIG. 13 is a table to illustrate a security matrix in a procedure in accordance with an embodiment of the invention;

FIG. 14A-14C together present a table illustrating safety assessments in a procedure in accordance with an embodiment of the invention;

Figure 1:
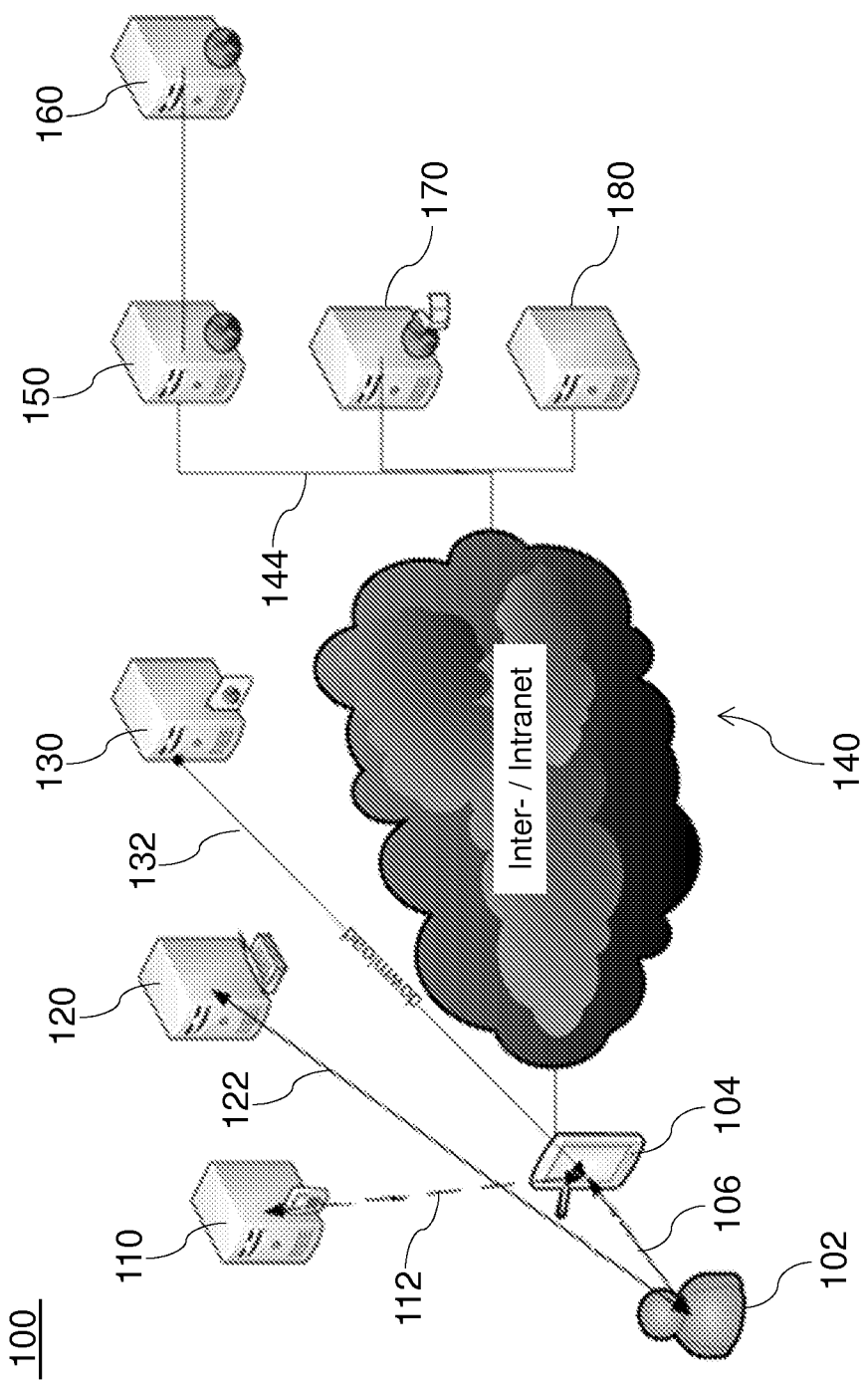
FIG. 1 is a representation of a communication system with an end device as an embodiment of the invention.

The illustrations in the figures are purely schematically and not necessarily to scale. The drawing representations and descriptions thereof are exemplary illustration of the principle of the invention to and not meant to restrict it in any way.

DESCRIPTION OF THE PREFERRED EMBODIMENTS

FIG. 1 shows a schematic block diagram to illustrate a communication system 100 with a mobile end device 104 as an embodiment of the present invention. The communication system 100 can be a company network of a company.

As shown in FIG. 1, a person 102 using a mobile end device 104 is integrated in the communication system 100. The person 102 is able to manipulate the end device 104 via a user interaction 106. An MDM server or a mobile device administration server MDM (for Mobile Device Management) 110 is able to communicate via a radio link 112 with the end device 104. The communication system 100 also notes an identity management server 120, which can be addressed via the person 102 via a user interaction 122 is accessible, an application server 130, which can communicate via a radio link 132 with the end device 104. In addition, the end device 104 can communicate via the Internet/Intranet 140 with multiple servers, which include a web services server 150, a web services server 160 for referenced web services, a streaming media server 170 and a web application server 180.

Although not presented in detail in FIG. 1 several agents are installed and activated, on the end device 106, which include an MDM-agent, an identity agent, a device agent, a network agent such and an application agent, as is described in more detail following.

Figure 2:
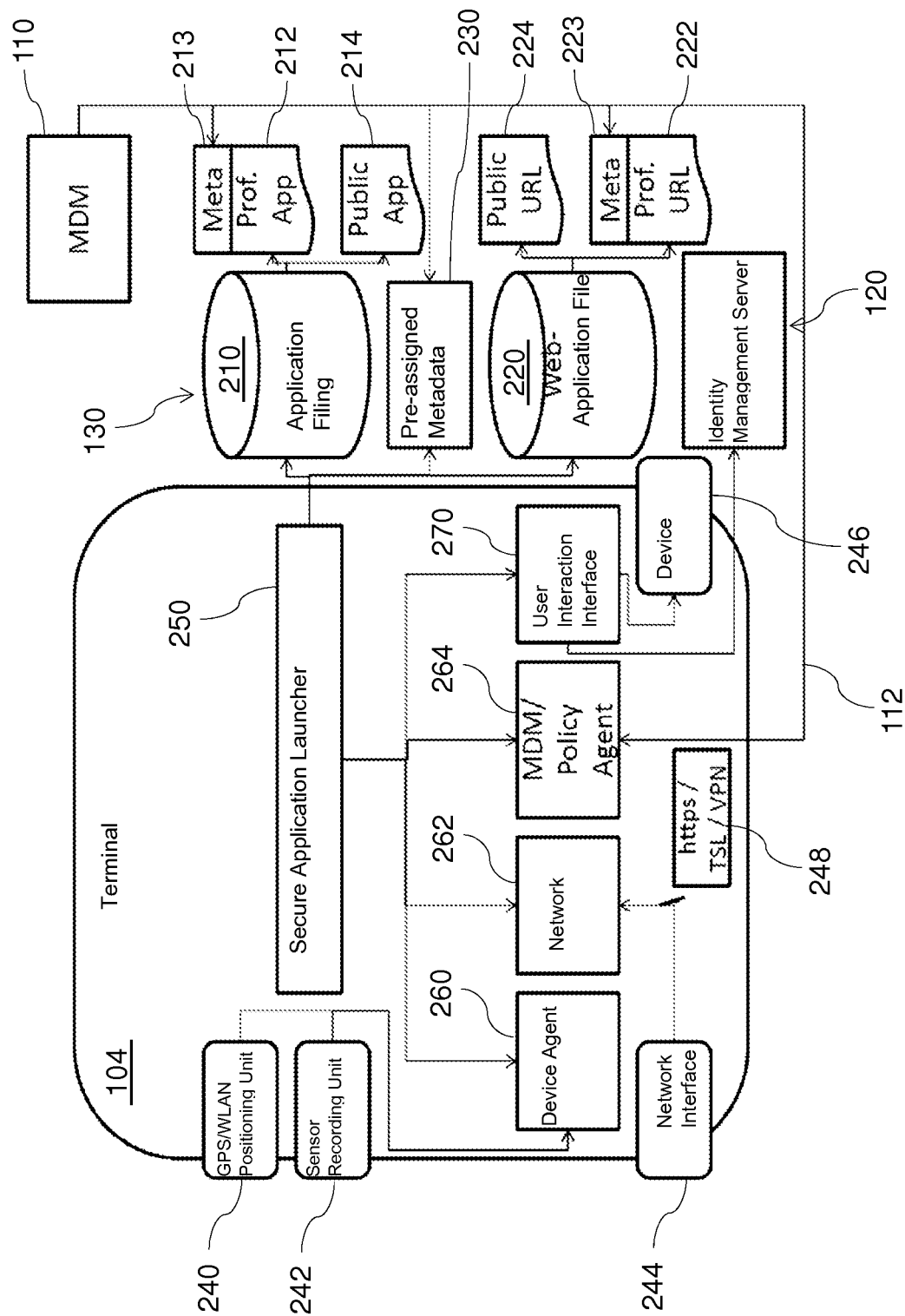
FIG. 2 is a representation of a part of the communications system of FIG. 1 with an end device as a further embodiment of the invention.

A part of the communication system 100 is illustrated in FIG. 2 in the form of a schematic block diagram. The partial illustration includes the mobile end device 104, the MDM server 110, the identity management server 120, the application server 130 and the web application server 180.

In accordance with the illustration in FIG. 2, the application server 130 features an application filing 210. In the application filing 210 are stored the corporate applications 212, which are associated with Meta data 213, and public applications 214. Equally, the web application server 180 features a web application filing 220, in which are stored company URLs 222, which are associated with Meta data 223, and public URLs 224. The MDM server 110 provides pre-assigned Meta data 230 and accesses the Meta data 213 of the application filing 210 of the application server 130 and the Meta data 223 of the application filing 220 of the web application server 180 to manage deploy these, where appropriate.

The pre-assigned Meta data 230 can be used for example, to lock all applications from "Google" on an end device. The blocking happens via a domain "Google.com" to be locked, which is filed in the pre-assigned Meta data 230 for example as an entry in a black list. The pre-assigned Meta data can be used generic, meaning not specific to a single application/individual applications, but also specifically for an application.

The end device 104 features a GPS WLAN positioning unit 240, a sensor recording unit 242, which can be executed as an interface for sensors or as an additional sensor, for example Bluetooth sensor, a network interface 244, for example, a device screen 246 and an https/TSL/VPN interface 248. In addition, a secure application launcher 250, a device agent 260, network agent 262, and MDM-/network policy agent 264 are provided, which are installed as a software product or integrated or connected and activated as a hardware unit. A user interaction interface (UII) 270 allows the interaction of the user 102 (FIG. 1) with the end device 104.

As shown in FIG. 2, the device agent 260 accesses the data provided by the GPS/WIFI positioning unit 240 and the sensor recording unit 242. The sensor recording unit 242 could, for example via an interface to the Bluetooth device driver of the device sense the proximity to a paired desktop phone (SDT) and, can derive from this the operational location to be the perceived as safe site "at work". This makes it possible, for the device agent 260 for example to determine the location and other operating conditions of the end device 104. The network agent 262 accesses data from the network interface 244 and the https/TSL-VPN interface 248. The MDM/policy agent 264 accesses data of the MDM server 110, and in particular the Meta data 213, 223, 230 managed by the MDM server 110. Via the user interaction interface 270 the user 102 (FIG. 1) can communicate, by means of the end device 104 with the identity management server 120, for example to log into a company network (i.e., the communication system 100, FIG. 1). Via the user interaction interface 270 also representations on the device screen 246 are generated and, provided that the device screen 246 is a touch-sensitive screen, input is interpreted via the device screen 246.

The secure application launchers 250, which can be designed as an operating system program/functionality and accesses the filed applications 212, 214 and links (URLs) 222, 224 in the application filing 210 of the application server 130 and in the web application filing 220 of web application server 180. The secure application launchers 250 has further been in connection with the device agent 260, the network agent 262, and the MDM/policy agent 264 and the user interaction interface 270.

Via the interplay between the agents 260, 262, 264 installed on the end device 104, and the system instances 110, 120, 130, 180 processes are worked, which control the safe access to and the operation of the end device 104 in an environment of the communications system 100. Some of these processes are described in more detail below.

Figure 9:
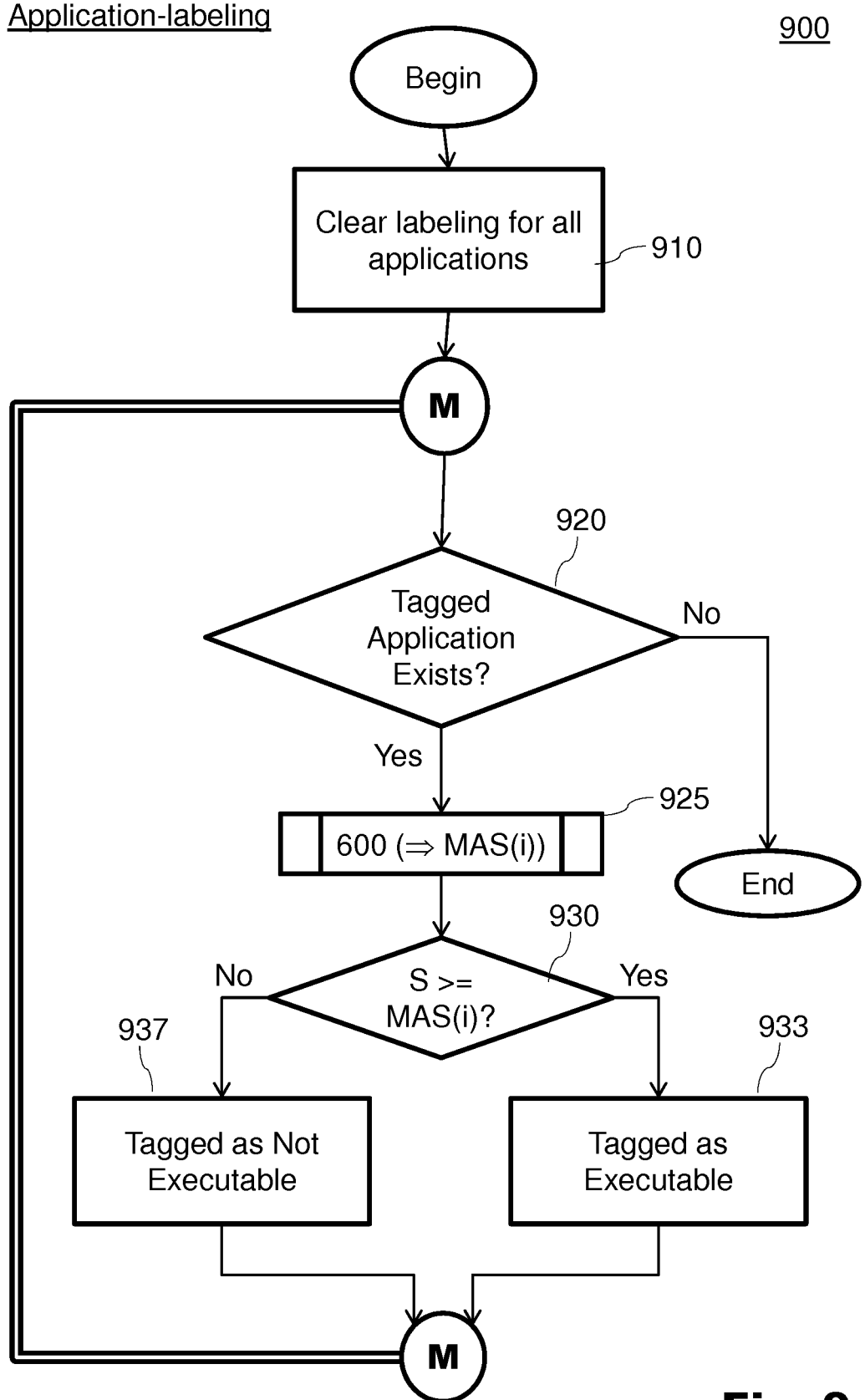
FIG. 9 is a flow chart of a process for application designation in a procedure in accordance with an embodiment of the invention.
Figure 10:
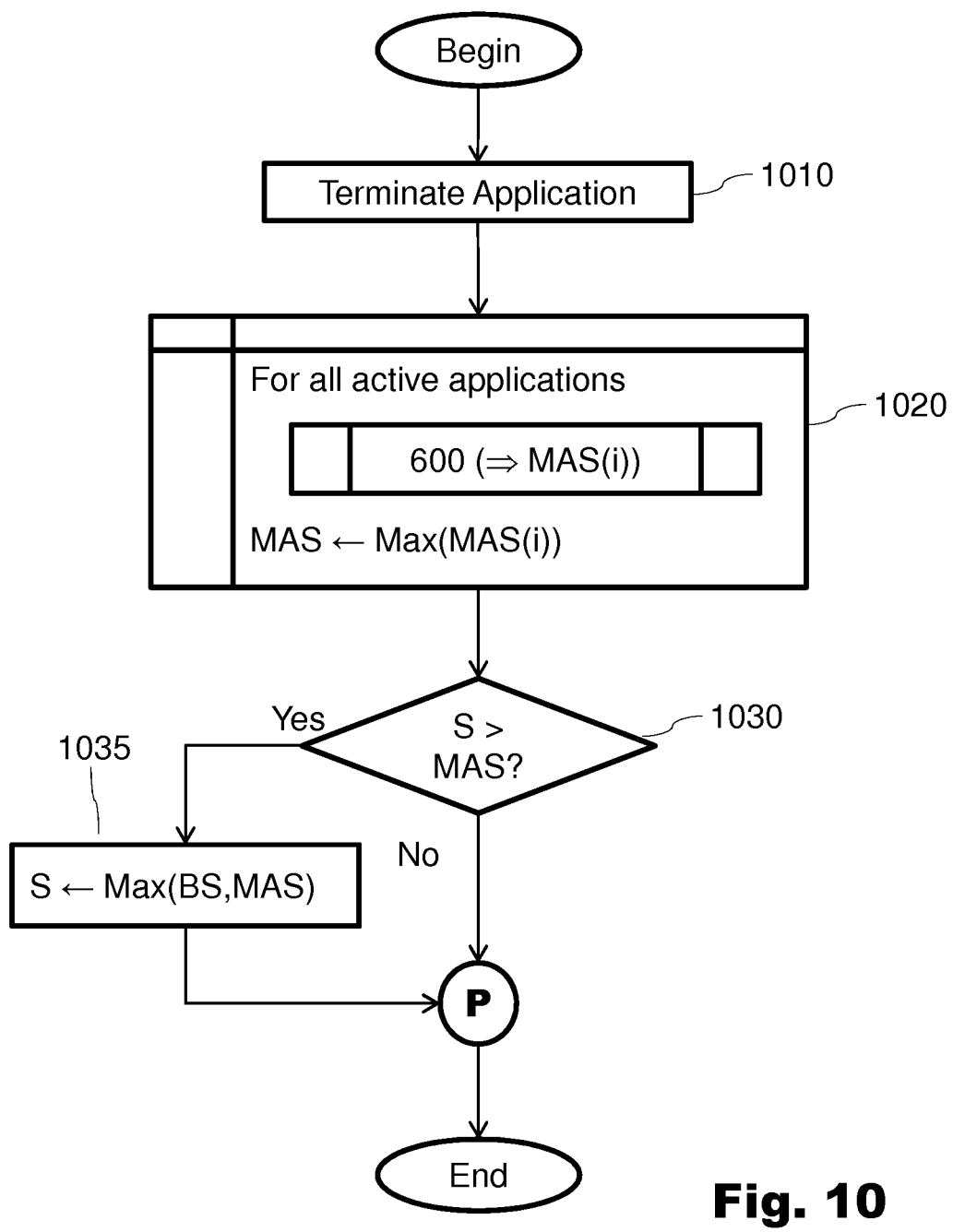
FIG. 10 is a flow chart of a process for application termination in a procedure in accordance with an embodiment of the invention.
Figure 11:
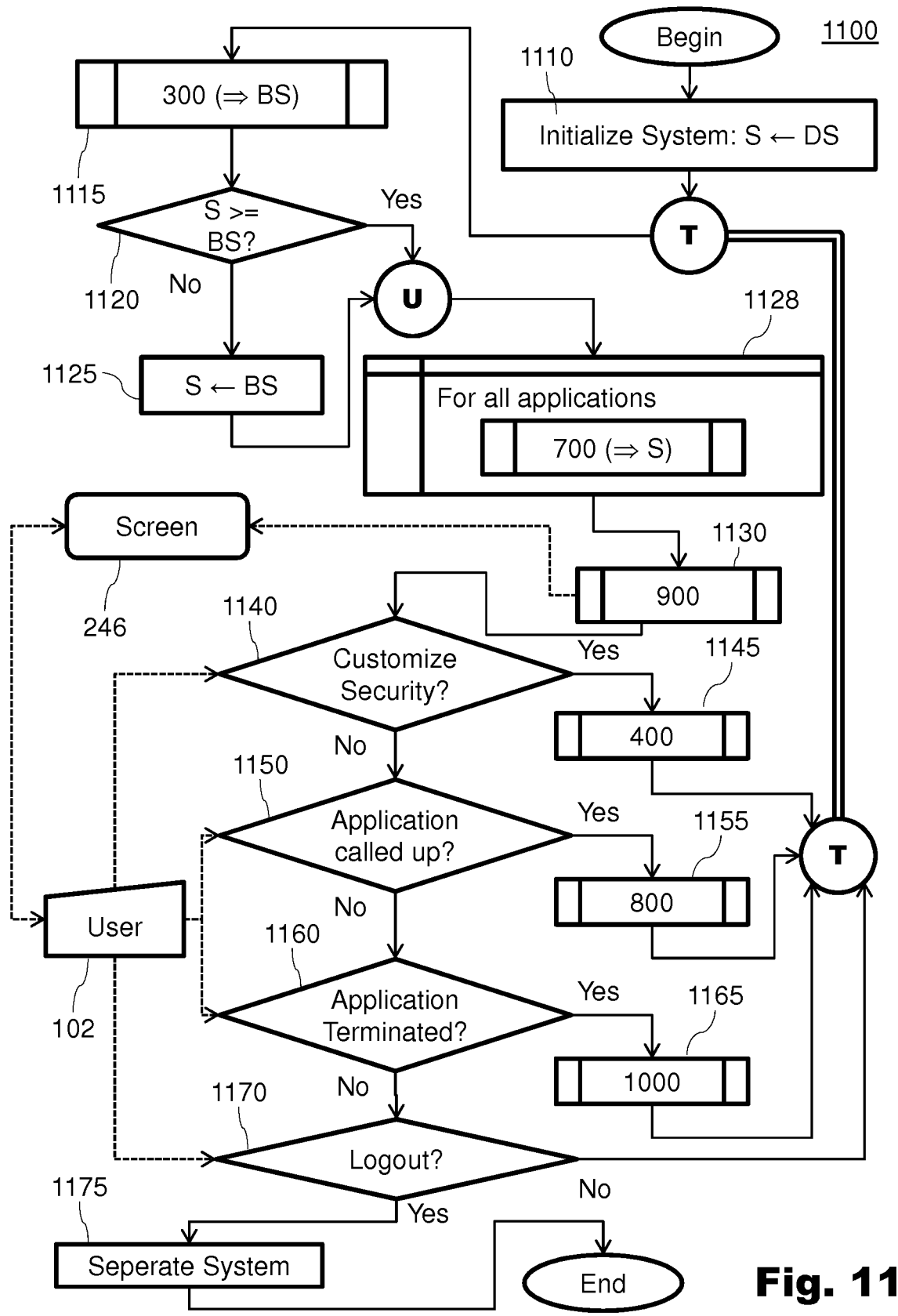
FIG. 11 is a flow chart of a complete process for the handling of security settings in a procedure in accordance with an embodiment of the invention.

To do this, first in FIGS. 3 to 10 some of the processes that are to be understood as subroutines which can be called by each other and an overall process shown in FIG. 11.

Figure 3:
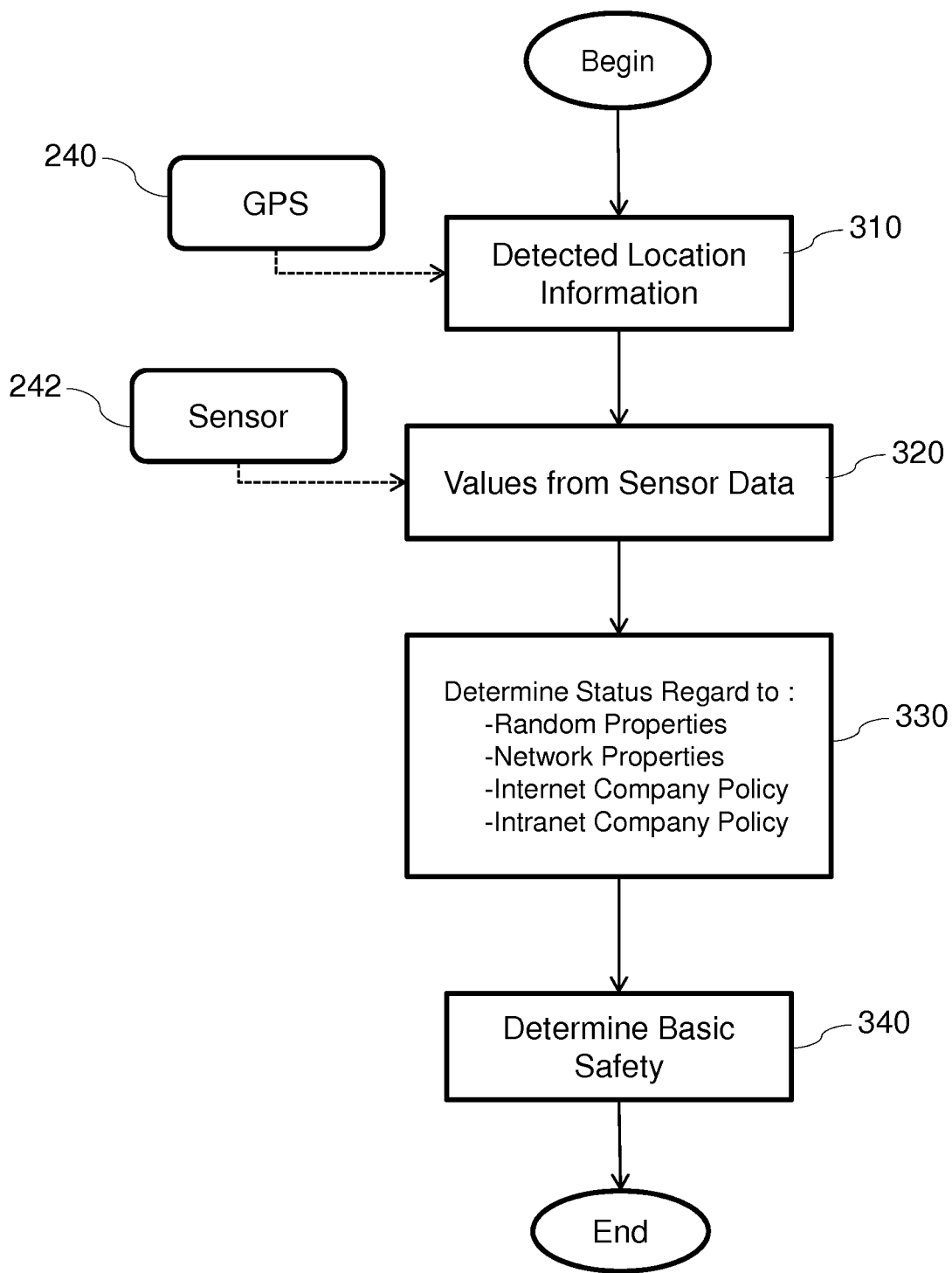
FIG. 3 is a flow chart of a process for automatic security setting in a procedure in accordance with an embodiment of the invention.

A process 300 describing an automatic setting of a base security BS in the end device 104 as an embodiment of the present invention is described through a flowchart in FIG. 3. A minimum security level is to be understood as a base security BS, which applies to the end device 104 within the communication system 100 (for example company network) and which is the lowest level acceptable.

After the start of (execution) of the process 300 location information is recorded in a Step 310 based on data of the GPS/WIFI positioning 240. Later on in Step 320 data of the sensor recording 242 are evaluated. Then in Step 330 the status of the end device 104 with respect to device properties, network properties and a company policy with regard to the Internet and Intranet is determined. Finally, in Step 340 the base security BS for the end device 104 is determined. Then the process 300 ends. In other words, it returns to the calling process, while handing over the base security BS as starting parameters. The base security BS can as a minimum security requirement be understood within the meaning of the invention.

Figure 4:
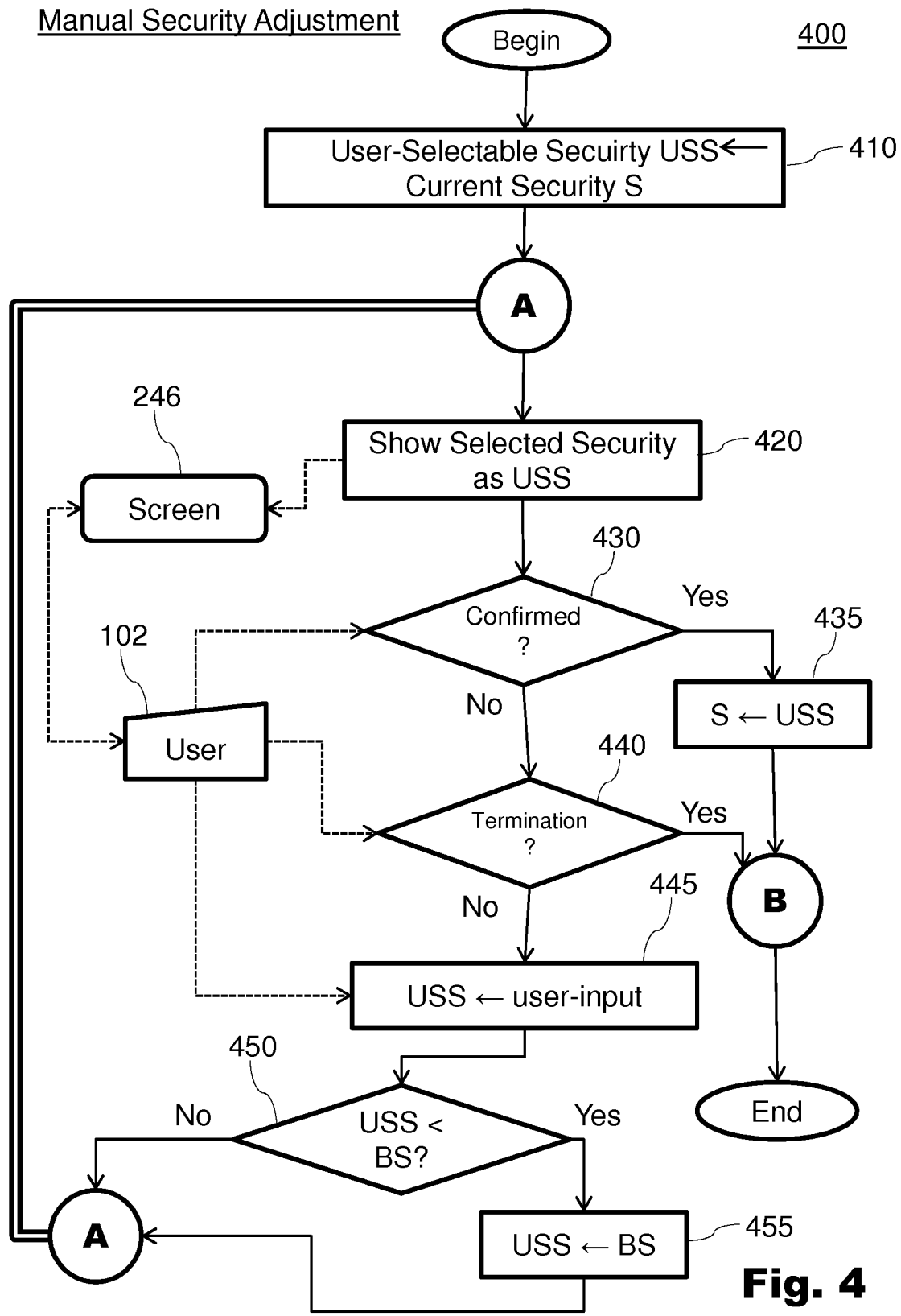
FIG. 4 is a flow chart of a process for manual security adjustment in a procedure in accordance with an embodiment of the invention.

A process 400 describing a manual adjustment to a present security S in the end device 104 as an embodiment of the present invention is described through a flowchart in FIG. 4. The current security S is to be understood as a security setting in the meaning of the invention, which applies for to end device 104 to a respective point in time. One of the objectives of the process is to ensure that the user of the end device 104 can adjust the current security S according to his needs, but may not undermine the base security BS.

After the start (execution) of the process 400 in Step 410 a volatile variable USS, which represents a user selected security level within the process 400, is pre-assigned with the value of the current security S. This means that when the process 400 is called the current security S is passed as an input parameter. Via a transition point A, the process 400 leads to Step 430, in which on the display 246 of the end device 104 the user selected security USS is displayed. Via an evaluation of an interaction of the user 102 is now determined in Step 430 whether the user 102 confirms the currently displayed user selected security USS or not.

Figure 5:
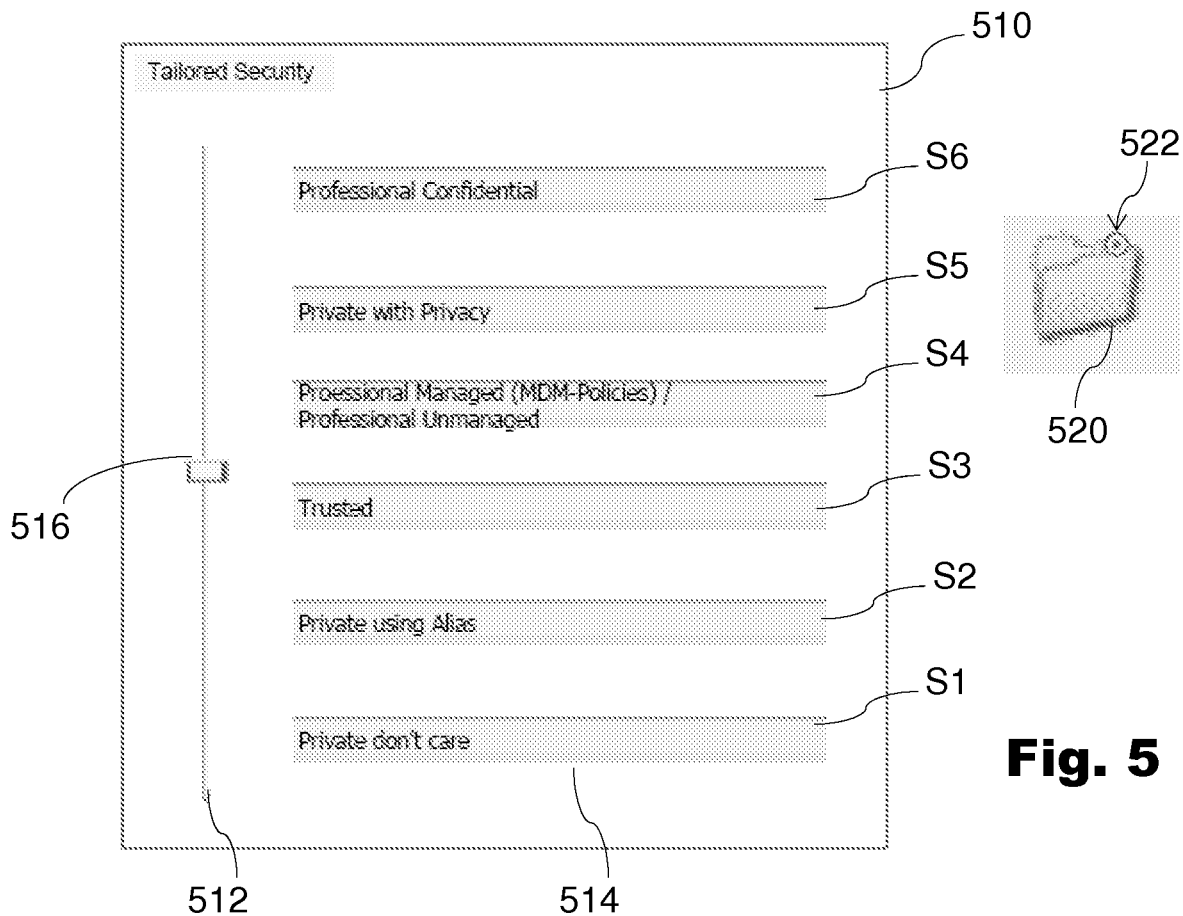
FIG. 5 is a representation of viewable content in accordance with an embodiment of the invention.

To illustrate the user interaction FIG. 5 shows a screen display during the execution of the process 400 as an embodiment of the present invention. In accordance with the illustration in FIG. 5, the screen display shows a selection box 510 and, as an example of an application, an application icon 520. The selection box 520 has a scale with a label 514 and a slider 516. The scale 514 has fields for default security levels S1 to S6. Each of the security levels S1 to S6 represents a defined security profile or a specified security setting, and may have several parts. The slider 516 is movable within the scale 512 to when prompted by a user interaction. I. e., by a typing on a keyboard, holding and moving with a pointing device (mouse, or similar) or touching and moving on a touch-sensitive surface of the screen 246, the slider 516 can be moved to a position corresponding to a desired security level S1 to S6. A confirmation of the current selection (position of the slider 516) or leaving the selection field (cancel the security setting) can be made via the usual ways. For example, for the confirmation of the current selection a return key, an OK field on the display screens 246, a pre-defined touch sequence on the display screen 246 or similar. Equally, there is an escape key for leaving the selection on the screen, a termination field on the display screen 246, a pre-defined touch sequence on the display screen 246, or similar.

The application icon 520 features a marking element 522, which depending on the set security level indicates by the application icon 520 whether or not the associated application can be activated or not.

Back to the end of the process 400 in FIG. 4, if the determination in Step 430 is positive (yes), in Step 435 the current security S with the user selected security USS is applied, and the process leads to a transition point B, after which the process ends with the current security S being passed as the output parameter. If the determination in Step 430 is negative (no), the process 400 continues to Step 440, in which is determined, if the user 102 has stopped the processing of the process 400. If the determination in Step 430 is positive (yes), the process progresses to the transition point B, and then the process ends, with the current security S being passed as the output parameter. Because in this case the user selected security was not confirmed, the current security S is identical with the security passed on by the process 400 security, i.e., in case of interruption of the process 400 by the user 102 the current security S is not changed. If the determination in Step 440 is negative (no), the process 400 continues to Step 445, in which any potential user input is assigned to the user selected security USS. Then, in Step 450 is determined if the user selected security USS is less than the base security BS, which is called when the process 400 is passed as input parameters, however cannot be modified by the process 400. If the determination in Step 450 is positive (yes), this means that the user selected security USS is not permitted, and therefore, it is in a subsequent Step 455 the user selected security USS is assigned the base security BS, which is the lowest possible security. After this, the process progresses to the transition point A, and then the processes beginning with Step 420 again until the process ends once via the transition point B. If the determination in Step 450 is negative (no), this means that the user selected security USS is permitted, and therefore the process 400 continues directly to the transition point A, and then the processes beginning with Step 420 again until the process ends once via the transition point B.

Figure 6:
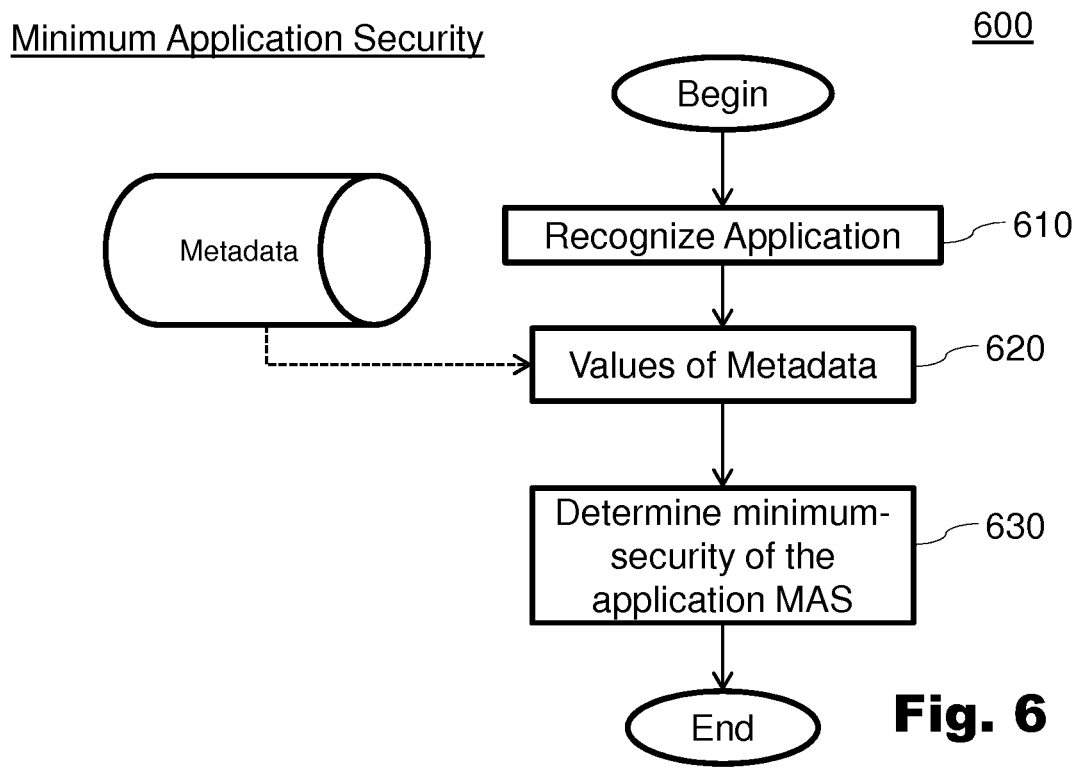
FIG. 6 is a flow chart of a sub-process for minimum application security in a procedure in accordance with an embodiment of the invention.

By means of a flowchart in FIG. 6 a process 600 for the determination of a minimum application security MAS of an application on the end device 104 is described as an embodiment of the present invention. The minimum application security MAS is to be understood as a security level, which is required to activate an application in the end device 104.

After the start (execution) of the process 600 an application is detected in Step 610. Meta data are then evaluated in Step 620. The Meta data are, on the one hand, Meta data, which are directly associated with the application, such as the Meta data 213 or 223 in FIG. 2, or in general valid Meta data, such as the pre-assigned Meta data 230 in FIG. 2. The Meta data are queried via the MDM/policy agent 264 (FIG. 2) from the MDM server 110, in particular to the start-up of an application/applications on the end device 104, or received from the secure application launcher 250 (FIG. 2) directly, in particular the duration, also known as real-time operation, one or more applications on the end device (104). By means of Meta data the minimum security of the application MAS is then determined in Step 630, and the process 600 ends, by passing the minimum application security MAS as the output parameter.

By means of a flow chart in FIG. 7 a process 700 for the monitoring of an application in the end device 104 as an embodiment of the present invention is described below. The process 700 is invoked for each application for example, if a setting or modification of the current security S has occurred.

After the start (execution) of the process 700 in Step 710 of the process 600 is invoked to receive the minimum application security MAS of the application. Then, in Step 720, is determined if the current security S is greater than or equal to the minimum application security MAS. If the determination in Step 720 is positive (yes), this means that the current security S is sufficient for the running of the application, and the process leads to a transition point E, whereas the process 700 ends. If the determination in Step 720 is negative (no), in Step 725 the current security S is proposed to be adapted to the minimum application security MAS by a corresponding dialog box being displayed on the screen 246. Then in Step 730 is determined whether or not the user 102 has confirmed the adaptation or not. If the determination in Step 730 is positive (yes), in Step 733 the current security S is raised to the value of the minimum application security MAS, and the process leads to the transition point E, whereas the process 700 ends. If the determination in Step 730 is negative (no), in Step 737 the application is terminated, and the process leads to the transition point E, whereas the process 700 ends. The termination of the application in Step 737 can be a note to the user 102 on the screen 246.

It should be noted that in the process 700 no comparison to the base security BS is carried out, since the current security S can never be less than the BS (cf. for example the process 400 in FIG. 4). An accidental lowering of the current security S below the base security BS cannot occur since adaptation of the current security S is only be offered when the minimum application security MAS is greater than the current security S, so that always an increase of the current security S goes hand in hand.

Figure 8:
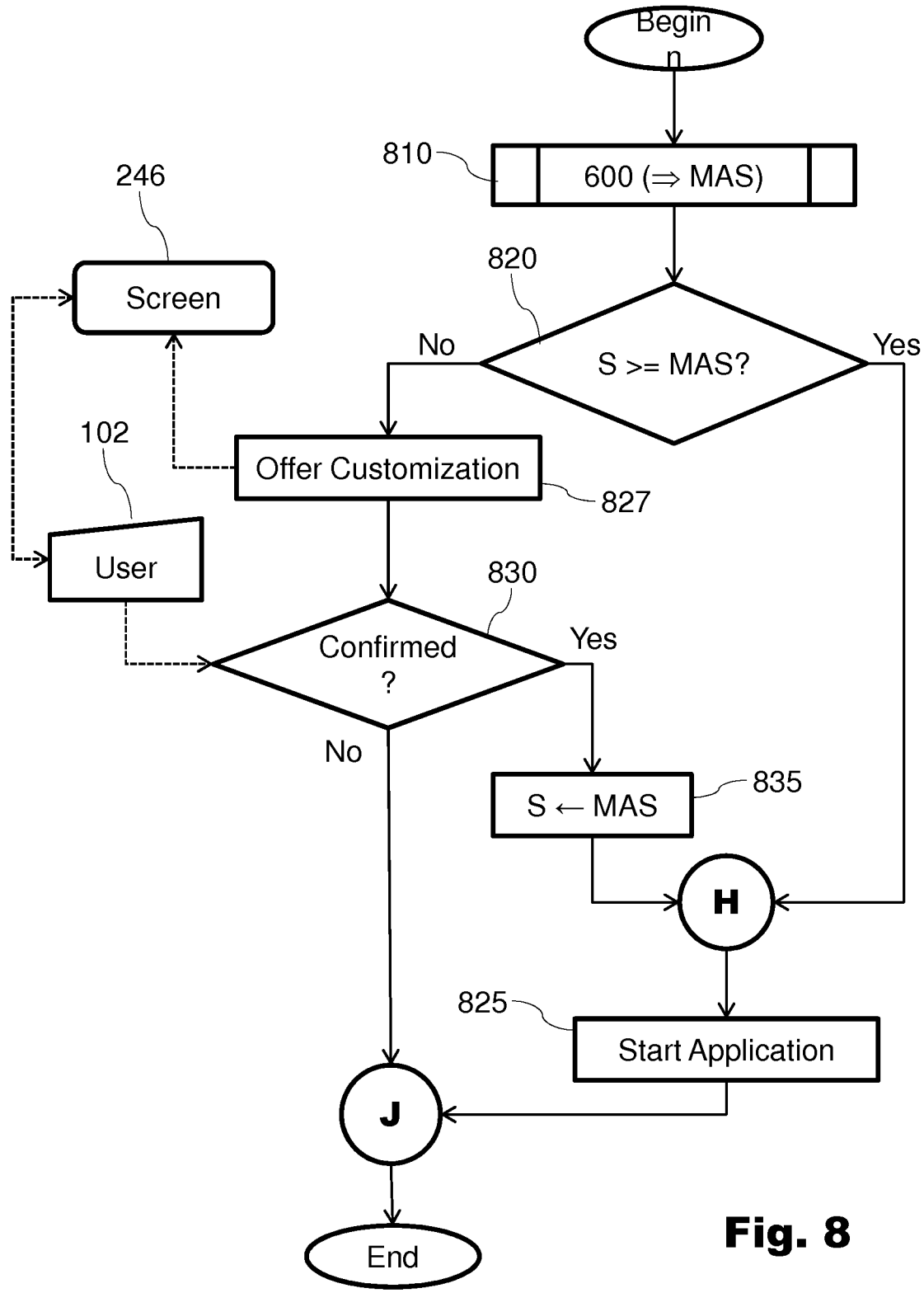
FIG. 8 is a flow chart of a process for executing an application in a procedure in accordance with an embodiment of the invention.

Using a flow chart in FIG. 8 now a process 800, which is called during the execution of an application in the end device 104, is described below as an embodiment of the present invention.

After the start (execution) of the process 800 in Step 810 of the process 600 is invoked to receive the minimum application security MAS of the application. Then, in Step 820, is determined if the current security S is greater than or equal to the minimum application security MAS. If the determination in Step 820 is positive (yes), this means that the current security S is sufficient for the running of the application, and the process leads to a transition point H, and then in Step 825 the application is started or the call of the application is released. After this, the process leads to a transition point J, whereupon the process 800 ends. If the determination in Step 820 is negative (no), in Step 827 the current security S is proposed to be adapted to the minimum application security MAS by for example a corresponding dialog box being displayed on the screen 246. Then in Step 830 is determined whether or not the user 102 has confirmed the adaptation or not. If the determination in Step 830 is positive (yes), in Step 835 the current security S is raised to the value of the minimum application security MAS, and the process leads via the transition point H to Step 825, to initiate—after adjustment of the current security S permutable—start of the application, whereupon the process 800 ends after passing the further transition point J. If the determination in Step 830 is negative (no), the process is continues directly to the transition point J, whereupon the process 800 ends and whereupon the application is does not start, since the current security S is too low compared to with the minimum application security MAS.

It should be noted that in the process 800 no comparison to the base security BS is carried out, since the current security S can never be less than the base security BS (cf. the proceeding explanation to process 700).

Using a flow chart in FIG. 9 now a process 900 for application designation is described, which can be called at different occasions in the end device 104 as an embodiment example of the present invention. For example, the process can be called during the boot-up process of the end device 104, new installation of an application, at the time of changes in the security parameters etc. or by default at regular intervals.

After the start (execution) of the process 900 in Step 910 potentially existing tags for all applications will be erased. Then the process progresses via a transition point M to Step 920, in which is determined, whether a not tagged application exists or not. This application receives the temporary name "i". In the context of the processes described here a tagging of an application is always a labeling with regard to the feasibility of the application within the meaning of the tagging element 522 in FIG. 5, unless otherwise stated. If the determination in Step 920 is negative (no), this means that no applications remain to be tagged (any longer), and therefore the process 900 ends. If the determination in Step 920 is positive (yes), in Step 925 the process 600 is called, to determine the minimum application security MAS of the application. Then, in Step 930, is determined if the current security S is greater than or equal to the minimum application security MAS of the application i. If the determination in Step 930 is positive (yes), this means that current security S is sufficient for the running of the application, and the process leads to Step 933, in which the application i is tagged as executable. After this, the process progresses to a transition point M to examine from there, starting with Step 920 if there are any (further) not tagged applications (see above). If the determination in Step 930 is negative (no), in Step 937 the application i is tagged as not executable, whereupon the process also leads to the transition point M, to examine from there, starting with Step 920 if there are any (further) applications which are not tagged (see above). It is clear that the process 900 only is terminated (exited) when there are no more tagged applications (no in Step 920).

It must be noted that the tagging of the applications as executable or not with a corresponding tagging element 522 only applies to the display on the device screen 246. When executing the application for security reasons always the process 800 is started for the application execution, which—regardless of the tagging element 522—examines the security settings for the application. Alternatively, it is conceivable that such a regime of tagging the applications in process 900 does not only apply to the screen, but also encompasses the tagging in a list stored in a protected area, which is queried at the time an application is started.

Using a flow chart in FIG. 10 now a process 1000, which is called during the termination of an application in the end device 104, is described below as an embodiment of the present invention.

After the start (execution) of the process 1000 in Step 1010 the respective application is terminated. Then the process progresses via a transition point M to a loop 1020, where for all active applications i the process 600 for determination of the (individual) minimum application security of the application i called and a (global) minimum application security the largest (highest) of the identified minimum application security MAS(i) is the individual applications I is assigned. Then, in Step 1030, is determined whether the (universal) minimum application security is greater than the current security S or not. If the determination in Step 1030 is positive (yes), this means that none of the currently active applications requires a higher security level than the current security S. Therefore, in this case the process leads to Step 1035, in which the current security is lowered to the highest minimum application security, but not lower than the base security. In this way it is ensured that no higher safety profile prevails than is absolutely necessary for the execution of the running applications. After this, the process leads to a transition point P, to which also the negative branch from Step 1030 leads (no), and the process 1000 will be terminated.

Since the execution of the process 1000 allows an intervention in the personal preferences of the user 102 of the end device 104 the steps 1020 to 1035 in the process 1000 can be designed as an optional (user deselectable) feature.

Through a flowchart FIG. 11 a process 1100 is explained which represents an overall process of the agent intervention as an embodiment of the present invention.

After the start (execution) of the process 1100 in Step 1110 the system is initialized by the current security S the value (the profile) s assigned to a preset default security DS by the end device. After this, the process leads to a transition point T, which can be understood as the beginning of a main loop of the process 1100. The main loop is beginning with the transition point T will be repeated until the system is shut down.

After the transition point T in Step 1115 the process 300 is called up to determine the base security. Then, in Step 1120, is determined if the current security S is greater than or equal to the minimum base security BS. If the determination in Step 1120 is positive (yes), this means that current security S with respect to the base security BS is sufficient, and the process progresses to a transition point U. If the determination in Step 1120 is negative (no), in the following Step 1125 of the present security S the value of the assigned base security BS is assigned, and then the process progresses to the transition point U and then the process progresses to a loop in Step 1128, in which the process 700 for all running applications i is called. In accordance with the above description in process 700 is controlled, if the current security S for the implementation of the respective application is sufficient, and, where appropriate, an adjustment of the existing security is offered. If the user of the end device 104 does not accept an adjustment of the existing security S, the respective application will be closed. After processing of the loop in Step 1128 in Step 1130 the process 900 is called in order to tag all available applications, in terms of their executability in the context of the current security S.

Then in Step 1140 is determined if the user 102 by means of a user interaction has requested an adjustment of the current security S. If the determination in Step 1140 is positive (yes), the process 400 to adapt the current security S is called in Step 1145, and then the process leads to the transition point T to start the main loop of the process 1100 over. If the determination in Step 1140 is negative (no), is in the following Step 1150 is determined whether or not the user 102 has called an application by means of a user interaction. If the determination in Step 1150 is positive (yes), the process 800 for a secure start of the application called in Step 1155, and then the process leads to the transition point T to start the main loop of the process 1100 over. If the determination in Step 1150 is negative (no), is in the following Step 1160 is determined whether or not the user 102 has terminated an application by means of a user interaction. If the determination in Step 1160 is positive (yes), the process 1000 for a termination of the application called in Step 1165, and then the process leads to the transition point T to start the main loop of the process 1100 over. If the determination in Step 1160 is negative (no), in the following Step 1170 is determined whether or not the user 102 has initiated a logout of the end device 104 by means of a user interaction. If the determination in Step 1170 is positive (yes), in Step 1175 the system is separated, i.e., the shutdown of the system is initiated, and then the process ends 1100. If the determination in Step 1170 is negative (no), the process leads of the transition point T to start the main loop of the process 1100 over.

Since, after the transition point T the main loop of the process 1100 starts over with the determination of the base security BS in Step 1115 begins, a change of the conditions can be taken into account at any time. Although not shown in the figure, when the base security BS is increased or decreased, a message to the user 102 of the end device 104 follows, so that the user 102 always has knowledge of the currently required security and can adjust accordingly.

In the above description of an overall process 1100 in FIG. 11 and associated subroutines as processes 300, 400, 600, 700, 800, 900, 1000 in FIGS. 3 to 10 applications were addressed. It is understood that the general concept of the application can include device features such as recording, playback, communication functions, etc., which can be treated in the same or similar way as described above and can be subjected to the prescribed security measures.

Figure 12:
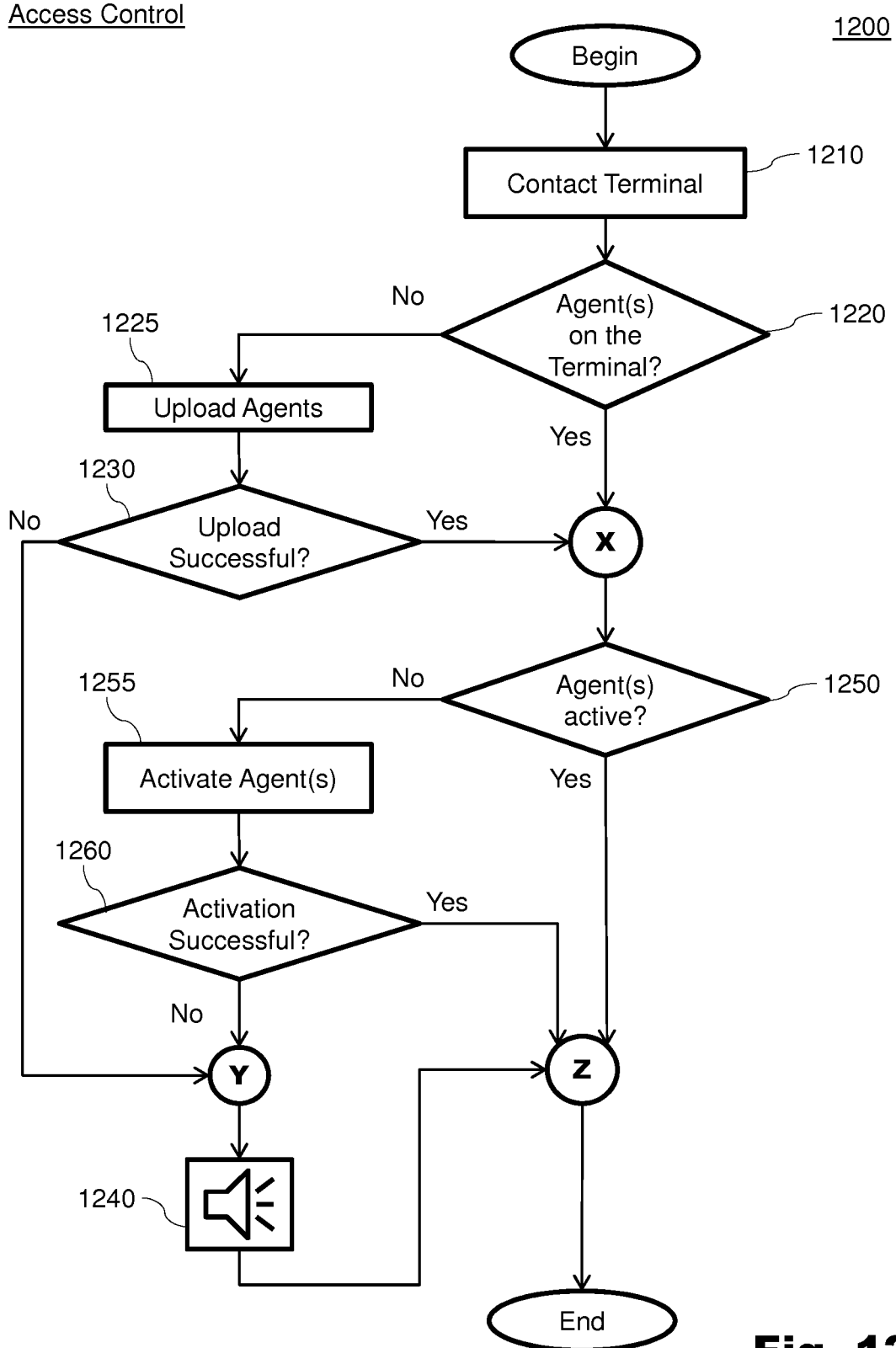
FIG. 12 is a flow chart of a process for entry control in a procedure in accordance with an embodiment of the invention.

Through a flowchart in FIG. 12 a process 1200 is described, which creates the access control on the end device 104 by an active agent monitored area described as an embodiment of the present invention. The process 1200 is processed via a security device such as the MDM server 110 (FIG. 1) called upon by a control loop and a parent process whenever a device is located. For further description it is assumed that the end device 104 (FIG. 1, 2) was located.

After the start (execution) of the process 1200 in Step 1210 the located end device 104 is contacted, i.e., a communication link 112 (FIG. 1) is established. The communication link 112 is not necessarily discernible for the user 102 of the end device, but it can be. Then in Step 1220 is determined, whether or not the agents needed for the execution of the processes 400, 600 to 1100 on the end device 104 are installed or not. If the determination in Step 1220 is positive (yes), the process progresses to a transition point X. If the determination in Step 1220 is negative (no), then the following Step 1225 is attempted to load the required agents to the end device 104 (upload). Then in Step 1230 it is determined if the upload of the agent was successful or not. If the determination in Step 1230 is positive (yes), the process progresses to a transition point X. If the determination in Step 1230 is negative (no), the process progresses to a transition point Y, whereupon in Step 1240 a warning is issued. After this, the process leads to a transition point Z, whereupon the process 1200 ends.

From the transition point X which is reached, if the required agent(s) is/are installed or has/have been successfully loaded on the end device 104, the process progresses to Step 1250, in which is determined, if the agent(s) is/are active or not. If the determination in Step 1250 is positive (yes), the process progresses to the transition point Z, and the process ends. If the determination in Step 1250 is negative (no), an attempt will be made in Step 1255, to activate the agents on the end device 104. In the next Step 1260 will be determined if the activation of the agent was successful. If the determination in Step 1260 is positive (yes), the process progresses to the transition point Z, and the process ends. If the determination in Step 1260 is negative (no), the process progresses to Step 1240 via the transition point Y to issue a warning. Optionally accompanied by an audible and/or visual signal a pop-up and/or an entry in the activity list of the mobile device could be issued. Furthermore for example, the lowest security level "private don't care" is assumed and the applications, which are there with excluded from execution, are tagged with a tagging element 522 in their application icons 520. After this, the process leads to a transition point Z, whereupon the process 1200 ends.

FIG. 13 shows a matrix of security profiles in a Table 1, and FIG. 14A to 14C display based on a multi-part table 2 aspects and views of an exemplary security assessment (Technical Security Assessments) according to the invention. For mobile scenarios technical requirements arose from the point of view of the devices, network, and company policy inter- and Intranet properties. These requirements will be taken into account through appropriate security technologies. Tables 1, 2, or similar tables can be used by the agent on the end device 104 for the implementation of the above-described processes.

For context-sensitive, automated security level setting (current security S) on the end device 104 in accordance with the illustration in FIG. 2 agents in accordance with the invention, which record the current status of the devices, the network, and company policy inter- and Intranet properties. The agents (in particular device agent 260) can in turn include location information or wireless sensors for determining their status. The network agent 262 controls accordingly the (secure) network access.

Business applications on the end device are in accordance with the invention enriched with Meta data in a secured form, e.g. checksum. This Meta data define at least the minimum security level (base security BS) and authenticity and access needs for the running of the concrete application (minimum application security MAS). In the case of end-to-end managed systems these Meta data can for example provided with Mobile Device Management (MDM) systems or are already included in the applications. Other applications are dependent on the type (e.g. web application) or origin (trusted/untrusted application store) supplied automated with default Meta data.

A security level with a base design profile (base security BS) will be assigned automatically to the end device 104 with regard to the devices, the network, and company policy properties associated with Inter- and Intranet. The base security BS can have the following values:

Private

Professional

Trusted

Different design profiles (current security S) arise according to the invention, if the user can influence its preference on the end device and he is informed about the current context. According to the invention the user can adjust the automatically identified security level situationally as follows:

Private:

Don't care, alias, or private

Professional:

Managed, unmanaged and confidential

In case of alias the identity of the user will be knowingly hidden through the use of aliases. When selecting this level the user chooses at least one alias for the subsequent use of applications.

Managed/unmanaged is to be considered subsequent as an alternative depending on whether the mobile device is managed and unmanaged. Managed in this context means that company policies are enforced on the device.

When the user turns on the end device or wakes up, the user according to the invention will be shown automatically the set security level (FIG. 5) and he/she can customize these still based on his/her preference of the design profile (cf. process 400 in FIG. 4).

If the user sequentially starts applications (cf. process 800 in FIG. 8), the system according to the invention compares on the end device the compatibility of the system minimum requirements of the application Meta data (minimum application security MAS) with the respective status recorded by the agent (current security S). Advantageously the application icons (520 in FIG. 5) and an additional information element (522 in FIG. 5) is added, which represent the current status in relation to the currently set security level (see process 900 in FIG. 9): for example, a red element indicates that the security level is insufficient, while green indicates an adequate security level. If the application is conform, it is started without user interaction. Otherwise the user is offered a conforming security level and when selecting appropriate security technologies are enabled and then the application will start.

Figure 7:
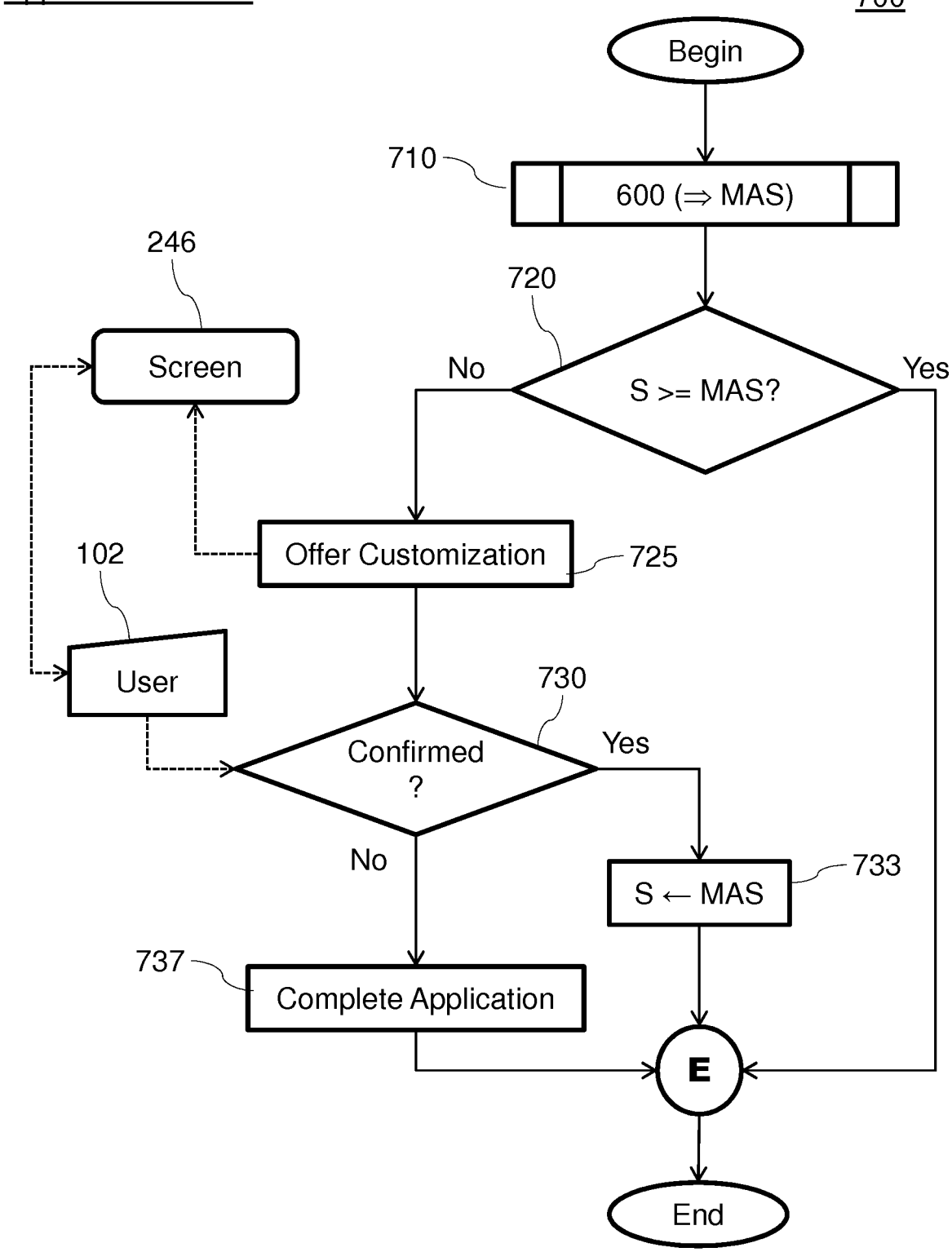
FIG. 7 is a flow chart of a process for application control in a procedure in accordance with an embodiment of the invention.

Through the automatically selected security level conflicts are created with applications running in the background, or in parallel, which are closed by the system automated or by user interaction, before the level is applied (cf. process 700 in FIG. 7).

Vice versa after closing an application it can be checked automatically, if a lower security level is sufficient for the remaining active applications and then automatically assumed (cf. process 1000 in FIG. 10).

The situational security solution according to the invention is aimed at the user 102 of the mobile device 104 (FIG. 1). The end device can optionally be managed via MDM (MDM server 110). An identity management system (identity management server 120) can determine the identity of the user 102 and grant the appropriate access authorizations to intra- or extranet applications and data. In addition, the end device can download and use web applications or applications from trusted/untrusted application stores (web service server 150, 160). For web applications, which in turn use other web applications should connect to them via transitive trust relationships and the calling application should be able to propagate these.

The invention allows with a simple user interface the automated setting of a context appropriate security level on mobile devices that are compatible with current security requirements. The user can influence the automatically selected security level through the design profiles, but it does not cancel the minimum security. The user is presented with a visual display of the security level and the compatibility with the selected application.

Because the security level in the system according to the invention changes over time, it is useful to visualize the applied security level to the user and with it to create security awareness and sensitivity with the user.

A procedure (and a mobile terminal) has been summarized for mobile applications with at least one user with which:

a) an initial security level (default security) is automatically set,
b) the currently required security level (current security) can be set automatically by context information,
c) the minimum required security level (base security) can be enforced by policies,
d) the required security level can be designed or adapted by the user,
e) when starting an application the compatibility of the application with the security level can be checked,
f) current non-compatible applications are automatically closed in case of a change in the security level,
g) the compatibility property of the application with the security level is displayed in the selection for example,
h) the automated set security level will be displayed to the user whereby the compliance with the minimum required security level cannot be bypassed.

The invention is defined expressly by the attached claims and can be applied to individual or any combination of the above characteristics. The features shown of the specific embodiments of the invention described can also be present in other embodiments of the invention, except as otherwise specified, or when it is prohibited for technical reasons.

What is claimed:

1. A method for the handling of security settings of a mobile end device having a processor and a non-transitory computer readable medium, the method comprising:
   determining, by a mobile end device, a minimum application security level required for running a first application prior to activating the first application to run the first application;
   in response to determining that the first application is intended to be run by the mobile end device and that a security level of the mobile end device is below the minimum application security level, emitting output via the mobile end device to facilitate initiation of a change in the security level at which the mobile end device is operating to permit the mobile end device to run the first application; and
   adjusting the security level at which the mobile end device is operating from a first security level to a higher second security level that meets or exceeds the minimum application security level of the first application in response to receiving input responsive to the emitted output to actuate the adjusting of the security level at which the mobile end device is operating.

2. The method of claim 1, comprising:
   emitting the output by the mobile end device via a display in response to determining that the first security level is less than the minimum application security level, the output configured to provide information relating to adjusting the first security level to be at the minimum application security level or to be greater than the minimum application security level to permit the first application to be run by the mobile end device; and
   wherein the method is performed such that a user of the mobile end device is unchanged during the adjusting of the security level of the mobile end device from the first security level to the second security level.

3. The method of claim 2, comprising:
   tagging the first application by the mobile end device, the tagging of the first application configured such that the first application is identified as requiring a security level that is greater than the first security level and prevents activation of the first application while the mobile end device has a security setting at the first security level.

4. The method of claim 3, wherein the tagging is performed such that an icon representing the first application is displayed by the mobile end device with indicia indicating the first application requires a security level that is greater than the first security level.

5. The method of claim 4, comprising:
   the mobile end device adjusting the first security level to be at a base security level prior to activating the first application.

6. The method of claim 1, wherein the mobile end device has a plurality of second applications stored on the computer readable medium of the mobile end device, the method comprising:
   for the first application and each of the second applications, the mobile end device tagging each of the applications that require a minimum application security level that is greater than the first security level such that the application is identified as requiring a security level that is greater than the first security level and prevents activation of the first application while the mobile end device has a security setting at the first security level.

7. The method of claim 1, comprising:
   the mobile end device communicating with a server after the mobile end device initiates running of the first application; and
   wherein the method is performed such that a logged-in user of the mobile end device is unchanged during the adjusting of the security level of the mobile end device from the first security level to the second security level.

8. The method of claim 1, comprising:
   detecting, by a sensor of the mobile end device, that the mobile end device is in proximity with a computer device that is associated with a user of the mobile end device to determine a location of the end device;
   the mobile end device setting the security level of the mobile end device based on the detecting performed by the sensor.

9. The method of claim 8, comprising:
   the mobile end device communicating with at least one server to log into a network based on the detecting performed by the sensor.

10. The method of claim 8, wherein the mobile end device setting of the security level is also based on an evaluation of contextual data regarding operating conditions of the mobile end device that comprise network properties and at least one pre-defined policy relating to operation of the mobile end device.

11. The method of claim 1, wherein the minimum application security level for the first application is defined in meta data of the first application stored in the memory of the mobile end device.

12. The method of claim 11, wherein the method is performed such that a user of the mobile end device is unchanged during the adjusting of the security level of the mobile end device from the first security level to the second security level; and wherein the meta data comprises a checksum.

13. The method of claim 1, comprising:

after closing the first application, checking to determine whether a lower security level is sufficient for all other applications being run by the mobile end device;

adjusting the security level of the mobile end device from the second security level to the lower security level that is sufficient for all the other applications being run by the mobile end device after the first application is closed upon determining that the lower security level is sufficient for all the other applications.

14. The method of claim 1, comprising:

determining, by the mobile end device, a minimum application security level required for running a second application prior to activating the second application to run the second application;

emitting output by the mobile end device in response to determining that the security level of the mobile end device is less than the minimum application security level required for the second application, the output configured to provide information relating to adjusting the security level to be at the minimum application security level required for the second application or to be greater than the minimum application security level required for the second application to permit the second application to be run by the mobile end device while the first application is also being run by the mobile end device.

15. A computer device comprising:

a processor connected to non-transitory computer readable medium, the non-transitory computer readable medium having a program stored therein that defines a method that is executed by the computer device when the processor runs the program, the method comprising:

determining, by the computer device, a minimum application security level required for running a first application prior to activating the first application to run the first application;

in response to determining that the first application is intended to be run by the computer device and that a security level of the computer device is below the minimum application security level, emitting output via the computer device to facilitate initiation of a change in the security level at which the computer device is operating to permit the computer device to run the first application;

adjusting the security level at which the computer device is operating from a first security level to a higher second security level that meets or exceeds the minimum application security level of the first application in response to receiving input responsive to the emitted output to actuate the adjusting of the security level at which the computer device is operating such that the first application is kept inactivated and not run while the computer device operates at a security level that is below the minimum application security level.

16. The computer device of claim 15, wherein the method also comprises:

emitting output by the computer device in response to determining that the first security level is less than the minimum application security level, the output configured to provide information relating to adjusting the first security level to be at the minimum application security level or to be greater than the minimum application security level to permit the first application to be run by the computer device to facilitate receiving the input.

17. The computer device of claim 15, wherein the method also comprises:

tagging the first application by the computer device, the tagging of the first application configured such that the first application is identified as requiring a security level that is greater than the first security level and prevents activation of the first application while the computer device has a security setting at the first security level.

18. The computer device of claim 17, wherein the method also comprises:

detecting, by a sensor of the computer device, information relating to at least one of: (i) a location of the computer device and (ii) a proximity of the computer device to another device to which a user of the computer device is associated;

the computer device setting the first security level based on the detecting performed by the sensor and based on an evaluation of contextual data regarding operating conditions of the computer device.

19. The computer device of claim 18, wherein the method also comprises:

after closing the first application, checking to determine whether a lower security level is sufficient for other applications being run by the computer device;

adjusting the first security level to the lower security level that is sufficient for all the other applications being run by the computer device after the first application is closed upon a determining that the lower security level is sufficient for all the other applications, the adjusted first security level being greater than or equal to the base security level.

20. A non-transitory computer readable medium having a program defining a method that is performed by a computer device when a processor of the computer device runs the program, the method comprising:

determining, by the computer device, a minimum application security level required for running a first application prior to activating the first application to run the first application;

in response to determining that the first application is intended to be run by the computer device and that a security level of the computer device is below the minimum application security level, emitting output via the computer device to facilitate initiation of a change in the security level at which the computer device is operating to permit the computer device to run the first application; and adjusting the security level at which the computer device is operating from a first security level to a higher second security level that meets or exceeds the minimum application security level of the first application in response to receiving input responsive to the emitted output to actuate the adjusting of the security level at which the computer device is operating such that the first application is kept inactivated and not run while the computer device operates at a security level that is below the minimum application security level.

* * * * *